(12) United States Patent
Tang et al.

(10) Patent No.: US 12,252,501 B2
(45) Date of Patent: Mar. 18, 2025

(54) METHODS OF PREPARING GLUFOSINATE

(71) Applicants: YongNong BioSciences CO., LTD., Zhejiang (CN); Ningxia YongNong BioSciences CO., LTD., YinChuan (CN)

(72) Inventors: Wenjie Tang, Zhejiang (CN); Chengjun Wu, Zhejiang (CN); Nan Li, Zhejiang (CN); Jianjie Xu, Zhejiang (CN); Xianzhong Tang, Zhejiang (CN); Chunhui Mao, Zhejiang (CN)

(73) Assignees: YONGNONG BIOSCIENCES CO., LTD., Zhejiang (CN); NINGXIA YONGNONG BIOSCIENCES CO., LTD., Ningxia (CN)

( * ) Notice: Subject to any disclaimer, the term of this patent is extended or adjusted under 35 U.S.C. 154(b) by 53 days.

(21) Appl. No.: 18/307,911

(22) Filed: Apr. 27, 2023

(65) Prior Publication Data
US 2024/0116960 A1 Apr. 11, 2024

(30) Foreign Application Priority Data

Nov. 17, 2022 (CN) .................. 202211440553.X
Jan. 10, 2023 (CN) .................. 202310033931.0

(51) Int. Cl.
C07F 9/30 (2006.01)
C07F 9/28 (2006.01)
C07F 9/6584 (2006.01)

(52) U.S. Cl.
CPC ............... C07F 9/301 (2013.01); C07F 9/28 (2013.01); C07F 9/65844 (2013.01)

(58) Field of Classification Search
CPC .................. C07F 9/301; C07F 9/6584
See application file for complete search history.

(56) References Cited

U.S. PATENT DOCUMENTS

| | | | |
|---|---|---|---|
| 3,320,251 A | 5/1967 | Maier | |
| 2014/0303315 A1 | 10/2014 | Nava et al. | |
| 2022/0259232 A1 | 8/2022 | Liu et al. | |
| 2022/0324888 A1* | 10/2022 | Liu | ........................ C07F 9/5004 |

FOREIGN PATENT DOCUMENTS

| | | |
|---|---|---|
| CN | 111018906 | 4/2020 |
| CN | 113248537 A | 8/2021 |
| CN | 116041387 A | 5/2023 |
| CN | 116375764 A | 7/2023 |
| CN | 116789695 A | 9/2023 |
| EP | 4043468 | 8/2022 |
| WO | 1992/02641 | 2/1992 |
| WO | 2021/143713 | 7/2021 |
| WO | 2022/077989 | 4/2022 |

OTHER PUBLICATIONS

Nesterov et al., Zhurnal Obshchei Khimii, 1969, 39(11), pp. 2457-2461 (pp. 2397-2400 of the English language version). (Year: 1969).*
Search Report of Taiwan Patent Application No. 112113285 dated Jul. 6, 2023, 1 page.
Office Action for CN202310033931.0 (with machine translation) mailed May 24, 2023.
Office Action for JP 2023-060856 (with machine translation) mailed Aug. 5, 2022.
Natchev, (1989), "Total synthesis and enzyme-substrate interaction of D-, DL-, and L-phosphinotricine, bialaphos (SF-1293) and its cyclic analogues," J Chem Soc. Perkin Trans 1, 89(1): 125-131.
European Search Report for EP23171798, mailed Nov. 15, 2023.
International Search Report for PCT/CN2023/131991, mailed Jan. 17, 2024.
Dorman, M.A. (1984) "Synthesis of Oligodeoxynucleotides and Oligodeoxynucleotide Analogs Using Phosphoramidite Intermediates," Tetrahedron, 40(1):95-10.
Rosmanitz,P. (1994) "New Proline derived Chiral Building Blocks for Nucleoside Methylphosphonate Synthesis" Tetrahedron, 50(19): 5719-5734.

(Continued)

Primary Examiner — Laura L Stockton
(74) Attorney, Agent, or Firm — McDonnell Boehnen Hulbert & Berghoff, LLP

(57) ABSTRACT

Disclosed is a method of preparing glufosinate, and specifically a method of preparing glufosinate represented by formula (I) or its salt or enantiomer, or a mixture of its enantiomers in any ratio, comprising a step of hydrolyzing a compound of formula (III) to generate a compound of formula (I). Due to a distinctive reaction mechanism adopted in the method of the present disclosure, a halogenated hydrocarbon by-product in the Michaelis-Arbuzov reaction can be avoided and thus the destructive impact of the halogenated hydrocarbon by-product on ozone in the aerosphere can be prevented. Accordingly, the equipment and engineering investments required for the separation, purification, and collection of the foregoing by-product are eliminated, and the potential environmental and safety hazards brought by the foregoing by-product are also avoided.

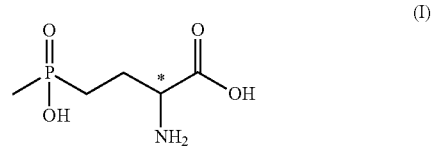

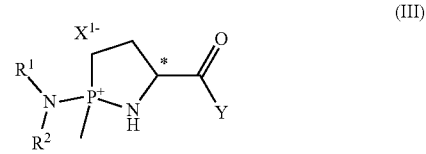

33 Claims, No Drawings

(56) References Cited

OTHER PUBLICATIONS

Office Action for KR 10-2023-0047956 (with machine translation) mailed Jan. 9, 2024.
First Office Action for CN202310711264.7 (with machine translation) mailed Nov. 30, 2023.
2nd Office Action for CN202310711264.7 (with machine translation) mailed Jan. 13, 2024.
Roelen et al., Synthesis of Alkylphosphon (othio)ate Analogues of DNA, Tetrahedron Letters, vol. 33, Issue 17, pp. 2357-2360, (published Dec. 31, 1992) abstract.

* cited by examiner

METHODS OF PREPARING GLUFOSINATE

CROSS-REFERENCE TO RELATED APPLICATIONS

The present disclosure claims priorities to Chinese Patent Application No. 202211440553.X filed on Nov. 17, 2022, and Chinese Patent Application No. 202310033931.0 filed on Jan. 10, 2023, which are incorporated herein by reference in their entireties.

TECHNICAL FIELD

The present disclosure relates to the field of herbicides, and specifically, to methods of preparing glufosinate.

BACKGROUND

Glufosinate is developed and produced by Hoechst AG in Germany with a chemical name of 4-[hydroxy(methyl)phosphono]-DL-homoalanine, which is a glutamine synthesis inhibitor and a non-selective contact herbicide. Its mechanism of action is to inhibit the activity of glutamine synthetase in plants, resulting in blocked glutamine synthesis, nitrogen metabolism disorder, and ammonium ion accumulation, thereby hindering the metabolism of the plants, and causing plants' death.

Glufosinate has the characteristics such as wide herbicidal spectrum, high activity, low toxicity, easy degradation in soil, safety to crops, small drift, good environmental compatibility, and rapid herbicidal action, and can control and quickly kill over 100 kinds of annual and perennial broad-leaved weeds and grass weeds, such as crabgrass and ryegrass.

In glufosinate racemates, only the L-isomer has a herbicidal activity and is easily decomposable in the soil, and thus has low toxicity to humans and animals, which further greatly reduce environmental burdens, and also has better activities and prevention effects against weeds with resistance than the racemates. Although glufosinate still dominates the global market, it is inevitable for the L-isomer to enter mainstream markets with technological innovation and progress.

The preparation of chiral pure L-glufosinate generally includes chemical and biological methods, and the chemical methods include racemate resolution, asymmetric synthesis and L-amino acid based total synthesis.

WO1995023805A1 discloses a method of preparing [L]- or [D]-homoalanin-4-yl-(methyl)phosphonic acid and its salts by the racemic resolution of D,L-homoalanin-4-yl-(methyl)phosphonic acid, via precipitation of one of the diastereoisomeric salts using chiral bases such as quinine or cinchonine. The usage of expensive chiral resolution reagents and low yields make it impractical for industry application.

U.S. Pat. No. 5,442,088A discloses a method of preparing L-glufosinate hydrochloride by using L-homoserine and its derivatives as starting material via ring-opening chlorination, esterification, Arbuzov reaction with methyl phosphite diester, and finally hydrolysis and purification, as shown below.

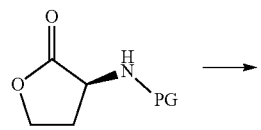

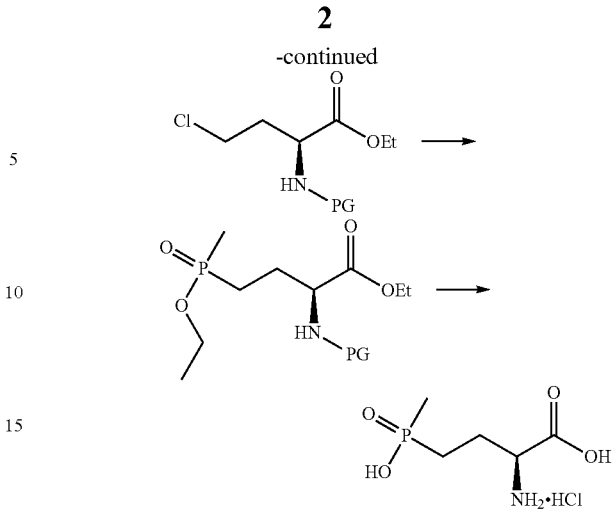

Although the multi-step procedure is straightforward and convenient, the Michaelis-Arbuzov reaction is generally carried out at a relatively high temperature (e.g. 130-140° C., or above) due to the low activity of chlorinated amino acid derivative. Meanwhile, the side reaction between the by-product ethyl chloride and diethyl methylphosphonite occurs at the reaction temperature, which further significantly increases the consumption of diethyl methylphosphonite, and results in low ee of L-isomer by racemization of starting material and product in situ.

CN113490671B discloses the preparation method of L-glufosinate using halogenated homoserine esters derivatives with or without amino-protection group as starting materials, comprising condensation and cyclization with monochloromethyl phosphinate, and hydrolyzation, as shown below.

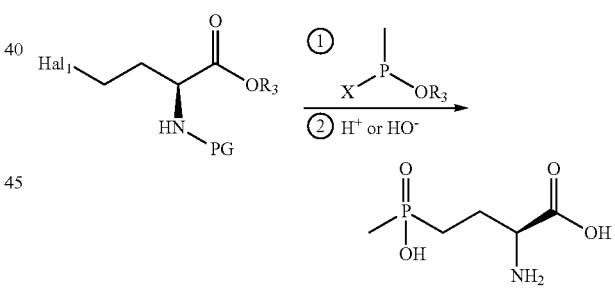

Multi-step procedures such as cyclization, chlorination, esterification and amino group protection are carried out by using L-homoserine as raw material with obviously prolonged preparation time. In addition, the Arbuzov reaction inevitably generates halogenated alkanes, which are Class III carcinogens destroying ozonosphere, especially the smaller molecular ones.

In recent years, with growing demand for glufosinate, developments and optimizations of the synthesis routes and procedures with mild reaction conditions, higher yield, lower cost, and simple operations are of great significance for reducing use of herbicides and increasing their efficiency.

SUMMARY

For the sake of conciseness, the reference to a compound of formula (N) (e.g., a compound of formula (III)) described hereinafter may also include any optical isomer, geometric isomer, tautomer, isomer mixture, or agriculturally acceptable salts of the compound of formula (N).

The term "optical isomer" refers to various isomers formed by a compound which has one or more chiral centers, with each chiral center having an R configuration or an S configuration. The optical isomers include all diastereoisomers, enantiomers, mesoforms, racemates, or mixtures thereof. For example, the optical isomer can be separated via a chiral chromatographic column or chiral synthesis.

The term "geometric isomer" refers to a cis isomer, a trans isomer, an E isomer and a Z isomer of a compound containing a double bond therein. The geometric isomer includes a cis isomer, a trans isomer, an E isomer, a Z isomer, or a mixture thereof.

The term "tautomer" refers to an isomer generated from rapid movement of a specific atom in a molecule between two positions. A person skilled in the art can understand that tautomers can transform into each other, and may coexist when an equilibrium state is reached in a specific state.

Unless otherwise specified, the reference to a compound of formula (N) (e.g., a compound of formula (III)) described herein also includes an isotope-labeled compound obtained by substituting any atom in the compound with its isotopic atom. That is, the compound of formula (N) in the present disclosure includes all agriculturally acceptable isotopically labeled compounds of the compound of formula (N), where one or more atoms are substituted by an atom having the same atomic number as an atom usually found in nature but a different atomic mass or mass quantity.

Examples of isotopes suitable for inclusion in the compound in the present disclosure include isotopes of hydrogen, such as $^2$H(D) and $^3$H(T); isotopes of carbon, such as $^{11}$C, $^{13}$C, and $^{14}$C; isotopes of chlorine, such as $^{37}$Cl; isotopes of fluorine, such as $^{18}$F; isotopes of iodine such as $^{123}$I and $^{125}$I; isotopes of nitrogen such as $^{13}$N and $^{15}$N; isotopes of oxygen, such as $^{15}$O, $^{17}$O, and $^{18}$O; and isotopes of sulfur such as $^{35}$S.

The isotopically labeled compound of formula (N) can generally be prepared by conventional techniques known to a person skilled in the art or by using a suitable isotopically labeled reagent in place of a previously used non-labeled reagent in a method analogous to that described in examples and preparations appended herein.

The compound of formula (N) may exist in a form of agriculturally acceptable salts such as an acid addition salt and/or a base addition salt of the compound of formula (N). Unless otherwise specified, the "agriculturally acceptable salt" used herein includes an acid addition salt or a base addition salt that may exist in the compound of formula (N).

The agriculturally acceptable salt of the compound of formula (N) includes the acid addition salt and base addition salt of the compound of formula (N). A suitable acid addition salt is formed by an acid that forms a non-toxic salt. Examples of the acid addition salt include, but are not limited to: acetate, adipate, aspartate, benzoate, benzenesulfonate, bicarbonate/carbonate, bisulfate/sulfate, borate, camphorsulfonate, citrate, cyclamate, edisylate, formate, fumarate, glucoheptonate, gluconate, glucuronic acid salt, hexafluorophosphate, 2-(4-hydroxybenzyl)benzoate, hydrochloride/chloride, hydrobromide/bromide, hydroiodide/iodide, 2-isethionate, lactate, malate, maleate, malonate, methanesulfonate, methylsulfate, naphthalate, 2-naphthalenesulfonate, nicotinate, nitrate, orotate, oxalate, palmitate, phosphate/hydrogen phosphate/dihydrogen phosphate, pyroglutamate, glucarate, stearate, salicylate, tannate, tartrate, tosylate, and trifluoroacetate. A suitable acid addition base is formed by a base that forms a non-toxic salt. Examples of the base addition salt include, but are not limited to, ammonium, aluminum, arginine, calcium, choline, diethylamine, diethanolamine, glycine, lysine, magnesium, meglumine, ethanolamine, potassium, sodium, lithium, tromethamine, and zinc salt. Half-salts of acids and bases such as hemisulfate and hemicalcium salts may also be formed. A method of preparing the agriculturally acceptable salt of the compound described herein is known to a person skilled in the art.

Some compounds in the present disclosure can be present in an unsolvated form or a solvated form (including a hydrated form). In general, the compounds of formula (N) fall within the scope of the present disclosure regardless of whether the compounds exist in the solvated or unsolvated form.

Some compounds in the present disclosure may exist in different crystalline or amorphous forms, and the compounds of formula (N) fall within the scope of the present disclosure regardless of the form of the compounds.

To avoid ambiguity, definitions of terms used herein are provided below. Unless otherwise specified, the terms used herein have the same meanings as those described blow.

As used in the specification of the disclosure and the appended claims, the singular forms, e.g., "a," "an" and "the" are intended to include the plural forms as well, unless the context clearly indicates otherwise.

A term "substituted" used herein means that one or more (preferably, 1 to 5, or more preferably, 1 to 3) hydrogen atoms in a group are independently replaced by a corresponding number of substituents.

A term "independently" used herein means that when the number of substituents is greater than one, these substituents may be the same or different.

A term "optional" or "optionally" used herein means that an event described by the term may or may not occur. For example, a group "optionally substituted" means that the group may be unsubstituted or substituted.

A term "heteroatom" used herein represents oxygen (O), nitrogen (N), or S(O)$_m$ (where m may be 0, 1, or 2, namely, a sulfur atom S, a sulfoxide group SO, or a sulfonyl group S(O)$_2$).

A term "alkyl group" used herein refers to saturated aliphatic hydrocarbon, including straight and branched chains. In some embodiments, an alkyl group has, for example, 1-6 or 1-3 carbon atoms. For example, the term "$C_1$-$C_6$ alkyl group" refers to a straight or branched chain radical having 1 to 6 carbon atoms. A definition of the term "$C_1$-$C_6$ alkyl group" includes terms "$C_1$-$C_6$ alkyl group", "$C_1$-$C_3$ alkyl group", and "$C_1$-$C_4$ alkyl group". Examples of the alkyl group include, but are not limited to, a methyl group, an ethyl group, a propyl group, an isopropyl group, a butyl group, an isobutyl group, a sec-butyl group, a tert-butyl group, a pentyl group, a 2-pentyl group, a 3-pentyl group, an isopentyl group, a neopentyl group, an (R)-2-methylbutyl group, an (S)-2-methylbutyl group, a 3-methylbutyl group, a 2,3-dimethylpropyl group, a 2,3-dimethylbutyl group, a hexyl group, and the like.

A term "$C_3$-$C_6$ cycloalkyl group" used herein refers to a cycloalkyl group having 3 to 6 ring-forming carbon atoms. For example, the $C_3$-$C_6$ cycloalkyl group includes a cyclopropyl group, a cyclobutyl group, a cyclopentyl group, or a cyclohexyl group.

A term "n-membered heterocycloalkyl group" used herein refers to a cycloalkyl group having m ring-forming carbon atoms and (n-m) ring-forming heteroatoms, where the heteroatom is at least one selected from N, O, and S. For example, three-membered to six-membered heterocycloalkyl groups include, but are not limited to, oxetane, thietane, azetidine, tetrahydrofuran, tetrahydrothiophene, pyrrolidine, tetrahydropyran, tetrahydrothiopyran, piperidine, morpholine, and piperazine.

A term "$C_6$-$C_{10}$ aryl group" used herein refers to an aryl group having an aromatic ring including 6-10 carbon atoms, or preferably, a phenyl group.

A term "n-membered heteroaryl group" used herein refers to a heteroaryl group having m carbon atoms forming an aromatic ring and (n-m) heteroatoms forming an aromatic ring, where the heteroatom is at least one selected from N, O, and S. For example, five-membered to ten-membered heteroaryl groups include, but are not limited to, pyrazine, pyrazole, pyrrole, furan, thiophene, thiazole, and pyridine.

A term "haloalkyl group" used herein refers to an alkyl group having one or more halogen substituents (at most a perhaloalkyl group, that is, each hydrogen atom of the alkyl group is substituted by a halogen atom). For example, a term "$C_1$-$C_6$ haloalkyl group" refers to a $C_1$—C alkyl group having one or more halogen substituents (at most a perhaloalkyl group, that is, each hydrogen atom of the alkyl group is substituted by a halogen atom). For another example, a term "$C_1$ haloalkyl group" refers to a methyl group having 1, 2, or 3 halogen substituents. Examples of the haloalkyl group include $CF_3$, $C_2F_5$, $CHF_2$, $CH_2F$, $CH_2CF_3$, $CH_2Cl$, and the like.

Herein, number ranges related to the number of substituents, the number of carbon atoms, and the number of ring atoms represent enumerations of all integers within the range, and the range is only used as a simplified representation. For example, "1-4 substituents" represent 1, 2, 3, or 4 substituents; and "3-8 carbon atoms" represent 3, 4, 5, 6, 7, or 8 carbon atoms. Therefore, the number ranges related to the number of substituents, the number of carbon atoms, and the number of ring atoms also cover any one of its sub-ranges, and each sub-range is also construed as being disclosed herein.

According to a first aspect, the present disclosure provides a method of preparing glufosinate represented by formula (I) or its salt or enantiomer, or a mixture of its enantiomers in any ratio, comprising:

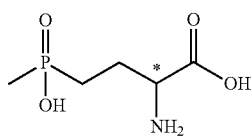

(I)

hydrolyzing a compound of formula (III) to generate a compound of formula (I);

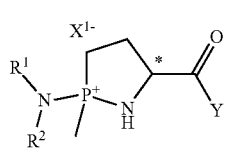

(III)

where:
$X^1$ is halogen;
Y is —$OR^3$ or —$N(R^4)(R^5)$;
$R^1$ and $R^2$ are each independently selected from hydrogen, a $C_1$-$C_5$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^1$ and $R^2$ form a three-membered to six-membered heterocycloalkyl group together with the N atom to which they are attached, where the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group;
$R^3$, $R^4$, and $R^5$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^4$ and $R^5$ form a three-membered to six-membered heterocycloalkyl group together with the N atom to which they are attached, where the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group; and
* denotes a chiral carbon atom.

According to the present disclosure, the compound of formula (I) may be present in a form of a single enantiomer. For example, in an embodiment of the present disclosure, the compound of formula (I) may be pure L-glufosinate or D-glufosinate. In addition, the compound of formula (I) may also be present in a form of the mixture of its enantiomers, and each of the enantiomers may be present in any ratio in the mixture of enantiomers. For example, in an embodiment of the present disclosure, the mixture of enantiomers in any ratio of the compound of formula (I) includes L-glufosinate and D-glufosinate in a ratio of 0.1:99.9 to 99.9:0.1. However, because only L-glufosinate is active, the L-enantiomer of the compound of formula (I) in the present disclosure may be preferably present in a greater ratio in the mixture of enantiomers. For example, in an embodiment, the mixture of enantiomers in any ratio of the compound of formula (I) includes L-glufosinate and D-glufosinate in a ratio of 50:50 to 99.9:0.1 (for example, 60:40, 70:30, 80:20, 90:10, 95:5, or 99:1).

In the preparation method in the first aspect of the present disclosure, the compound of formula (III) can be hydrolyzed directly in a neutral condition, that is, a hydrolysis reaction can be performed directly in presence of water. In addition, the hydrolysis can also preferably be performed in presence of an acid or an alkali. More specifically, the acids may be at least one selected from hydrochloric acid, sulfuric acid, hydrobromic acid, hydroiodic acid, phosphoric acid, nitric acid, formic acid, and acetic acid, and is preferably hydrochloric acid or sulfuric acid; and the alkali can be selected from hydroxide, carbonate, bicarbonate, or basic carbonate of alkali metal or alkaline earth metal, ammonia, organic alkali, or organic amine, and is preferably sodium hydroxide or triethylamine. In addition, in an embodiment of the present disclosure, the hydrolysis can be performed, for example, at a temperature of 30° C. to 140° C. (for example, 40° C., 50° C., 60° C., 70° C., 80° C., 90° C., 100° C., 110° C., 120° C., or 130° C.) or preferably 70° C. to 110° C.

As a preferable solution of the compound of formula (III), $R^1$, $R^2$, $R^3$, $R^4$, and $R^5$ may be each independently selected from hydrogen, a $C_1$-$C_6$ alkyl group, or a $C_3$-$C_6$ cycloalkyl group, and is preferably hydrogen, a methyl group, an ethyl group, a propyl group, an isopropyl group, a butyl group, an isobutyl group, a tert-butyl group, a pentyl group, a hexyl group, a cyclopropyl group, a cyclobutyl group, a cyclopentyl group, or a cyclohexyl group. In addition, in a preferable embodiment, when used herein, halogen may be selected from fluorine, chlorine, or bromine; the $C_1$-$C_6$ alkyl group may be selected from a methyl group, an ethyl group, a propyl group, or an isopropyl group; the $C_2$-$C_6$ alkenyl group may be selected from a vinyl group, a propenyl group, a 1-butenyl group, a 2-butenyl group, or an isobutenyl group; the $C_2$-$C_6$ alkynyl group may be selected from an ethynyl group, a propynyl group, a 1-butynyl group, or 2-butynyl group; the $C_3$-$C_6$ cycloalkyl group may be selected from a cyclopropyl group, a cyclobutyl group, a cyclopentyl group, or a cyclohexyl group; the three-membered to six-membered heterocycloalkyl group may be selected from a cyclopropyl group, a cyclobutyl group, a cyclopentyl group, or a cyclohexyl group including at least one heteroatom of N, O, or S; the $C_6$-$C_{10}$ aryl group may be selected from a phenyl group or a naphthyl group; and/or the five-membered to ten-membered heteroaryl group may be selected from a pyrazinyl group, a pyrazolyl group, a pyrrolyl group, a furyl group, a thienyl group, a thiazolyl group, or a pyridyl group.

As an alternative solution to the compound of formula (III), $R^1$, $R^2$, $R^3$, $R^4$, and $R^5$ may be each independently selected from —Si($R^6$)($R^7$)($R^8$), and $R^6$, $R^7$, and $R^8$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, where the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_5$ cycloalkyl group, or a $C_6$-$C_{10}$ aryl group.

Further, the preparation method in the first aspect of the present disclosure may further include a step of preparing the compound of formula (III).

In an embodiment of the present disclosure, the compound of formula (III) is prepared by subjecting a compound of formula (II)

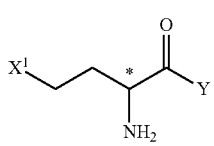

to a reaction with any one of the following compounds or mixtures: a compound of formula (IV); a compound of formula (V); a compound of formula (IV) and a compound of formula (V); a compound of formula (IV) and a compound of formula (VII); a compound of formula (V) and a compound of formula (VII); or a compound of formula (IV), a compound of formula (V), and a compound of formula (VII);

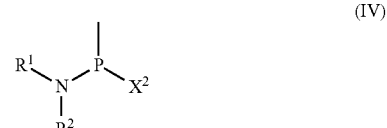

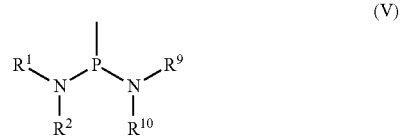

where:
$X^2$ is halogen;
$R^1$, $R^2$, $X^1$, Y, and * are as defined above; and
$R^9$ and $R^{10}$ are each independently selected from hydrogen, a $C_1$-$C_5$ alkyl group, a $C_2$-$C_5$ alkenyl group, a $C_2$-$C_5$ alkynyl group, a $C_3$-$C_5$ cycloalkyl group, a three-membered to six-membered heterocycloalkyl group, a $C_6$-$C_{10}$ aryl group, or a five-membered to ten-membered heteroaryl group, or $R^9$ and $R^{10}$ form a three-membered to six-membered heterocycloalkyl group together with the N atom to which they are attached, where the $C_1$-$C_5$ alkyl group, the $C_2$-$C_5$ alkenyl group, the $C_2$-$C_5$ alkynyl group, the $C_3$-$C_5$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_5$ cycloalkyl group, or a $C_6$-$C_{10}$ aryl group.

In the step of preparing the compound of formula (III) described above, the compound of formula (IV), the compound of formula (V), and/or the compound of formula (VII) used can be added to a reaction system as initial reactants, or can also be obtained by in situ reaction of another compound. For example, the compound of formula (IV) can be obtained by the in-situ reaction of the compound of formula (VII) and the compound $NHR^1R^2$ of formula (VIII), or obtained by the in-situ reaction of the compound of formula (V) and the compound of formula (VII); and the compound of formula (V) (herein, $R^9$ and $R^{10}$ can correspond to $R^1$ and $R^2$, respectively) can be obtained by the in-situ reaction of the compound of formula (VII) and the compound of formula (VIII). As an alternative solution for preparing the compound of formula (III), the compound of formula (III) can also be obtained by subjecting the compound of formula (II) to a reaction with the compound of formula (VII) and the compound of formula (VIII). Further, in the foregoing various steps for preparing the compound of formula (III), there is no limitation on a feeding order of various raw materials, that is, the various raw materials can be fed into the reaction system in any order.

According to the present disclosure, the foregoing steps for preparing the compound of formula (III) can preferably be performed in presence of a deacid reagent. Specifically, the deacid reagent may be selected from $NR^{11}R^{12}R^{13}$, where $R^{11}$, $R^{12}$, and $R^{13}$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or any two of $R^{11}$, $R^{12}$, and $R^{13}$ form a three-membered to six-membered heterocycloalkyl group together with the N atom to which they are attached, where the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group.

In addition, since the compound $NHR^1R^2$ of the formula (VIII) conforms to a general formula of the foregoing deacid reagent, that is, the compound $NHR^1R^2$ meets a requirement for acting as the deacid reagent, an excess of the compound of the formula (VIII) can be added as a deacid reagent that is preferably present in the reaction. In a preferred embodiment of the present disclosure, the deacid reagent may be at least one selected from excesses of the compound of formula (VIII), ammonia, triethylamine, morpholine, and piperidine.

Further, the foregoing step for preparing the compound of formula (III) can be performed in absence of a solvent or in presence of an organic solvent. In an embodiment of the present disclosure, the organic solvent is selected from aromatic hydrocarbon solvents (for example, benzene, xylene, trimethylbenzene, ethylbenzene, diethylbenzene, cumene, diisopropylbenzene, halogenated benzene, or dihalobenzene), alkane solvents (for example, n-hexane, cyclohexane, n-heptane, methylcyclohexane, or ethylcyclohexane), halogenated hydrocarbon solvents (for example, dichloromethane, dichloroethane, chloroform, or carbon tetrachloride), ether solvents (for example, tetrahydrofuran, methyl tetrahydrofuran, methyl tert-butyl ether, diisopropyl ether, methyl cyclopentyl ether, ethylene glycol dimethyl ether, dioxygen hexacyclic, or diglyme), ester solvents (for example, ethyl acetate, isopropyl acetate, or butyl acetate), amide solvents (for example, N,N-dimethylformamide, N,N-dimethylacetamide, hexamethylphosphoric triamide, N-methylpyrrolidone, or 1,3-dimethyl-2-imidazolinone), or sulfur-containing solvents (for example, dimethylsulfoxide or sulfolane). Preferably, the organic solvent is at least of selected from toluene and chlorobenzene.

Consumption of each reactant and reaction conditions in the foregoing step for preparing the compound of formula (III) can be adjusted based on an actual need and knowledge of a person skilled in the art. In an embodiment of the present disclosure, a molar ratio among the compound of formula (II), total usage of the compounds of formulas (IV), (V) and (VII), and the deacid reagent may be 1:(0.9-5):(0.9-5), or preferably 1:(1.05-1.5):(1.05-1.5). In another embodiment of the present disclosure, the reaction may be performed at a temperature of −20° C. to 10° C. (for example, −10° C., −5° C., 0° C., or 5° C.) for 1 to 15 hours (for example, 2 h, 4 h, 6 h, or 12 h), and then at 10° C. to 120° C. (for example, 20° C., 40° C., 60° C., 80° C., or 100° C.) for 0.5 to 24 hours (for example, 1 h, 2 h, 4 h, 6 h, 12 h, or 18 h).

As an alternative solution for preparing the compound of formula (III), the compound of formula (III) may be further prepared in a method including steps of:
a) subjecting a compound of formula (II) to a reaction with any one of the following compounds or mixtures: a compound of formula (IV); a compound of formula (V); a compound of formula (IV) and a compound of formula (V); a compound of formula (IV) and a compound of formula (VII); a compound of formula (V) and a compound of formula (VII); or a compound of formula (IV), a compound of formula (V), and a compound of formula (VII);

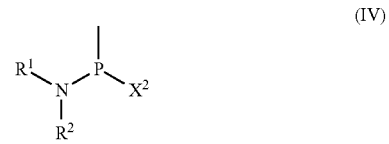

(IV)

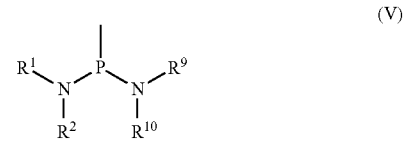

(V)

(VII)

to obtain the compound of formula (VI);

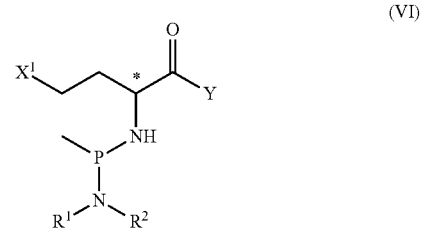

(VI)

and,
b) preparing the compound of formula (III) via a reaction with the compound of formula (VI);
where $X^1$, $X^2$, Y, $R^1$, $R^2$, $R^9$, $R^{10}$, and * are as defined above.

In the alternative solution, a reaction raw material is basically the same as that in the foregoing solution except that it is clarified that the compound of formula (VI) obtained is used as an intermediate for a subsequent reaction. Therefore, for selection of the reaction raw material, the reaction system, reaction conditions, and the like in the alternative solution, refer to the foregoing solution for preparing the compound of formula (III). Details are not described herein again to avoid unnecessary redundancy. Taking the reaction condition as an example for description, the reaction in step a) may be performed at a temperature of −20° C. to 10° C. for 1 to 15 hours; and the reaction in step b) is performed at a temperature of 10° C. to 120° C. for 0.5 to 24 hours.

According to a second aspect, the present disclosure provides a method of preparing glufosinate represented by formula (I) or its salt or enantiomer, or a mixture of its enantiomers in any ratio, including steps of

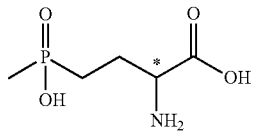
(I)

in absence of a solvent or in presence of an organic solvent, subjecting a compound of formula (II)

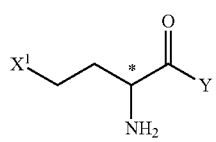
(II)

to a reaction with any one of the following compounds or mixtures: a compound of formula (IV), a compound of formula (V), a compound of formula (IV) and a compound of formula (V), a compound of formula (IV) and a compound of formula (VII), a compound of formula (V) and a compound of formula (VII), or a compound of formula (IV), a compound of formula (V) and a compound of formula (VII), to obtain an intermediate;

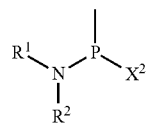
(IV)

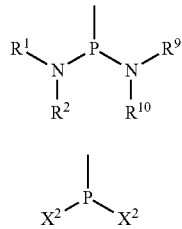
(V)

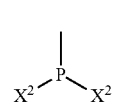
(VII)

and hydrolyzing the intermediate under an acidic, neutral, or alkaline condition, to obtain a compound of formula (I);

where $X^1$, $X^2$, Y, $R^1$, $R^2$, $R^9$, $R^{10}$, and * are as defined above.

For the organic solvent, the hydrolysis condition, and the like in the preparation method in the second aspect of the present disclosure, refer to the first aspect of the present disclosure. Details are not described herein again to avoid unnecessary redundancy.

According to a third aspect, the present disclosure provides a compound of formula (III) or its salt or enantiomer, or a mixture of its enantiomers in any ratio;

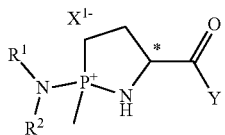
(III)

where $X^1$, Y, $R^1$, $R^2$, and * are as defined above.

Preferably, the compound of formula (III) can be prepared with reference to the first aspect of the present disclosure.

According to a fourth aspect, the present disclosure provides a method of preparing a compound of formula (III) or its salt or enantiomer, or a mixture of its enantiomers in any ratio, including a step of:

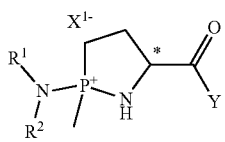
(III)

subjecting a compound of formula (II)

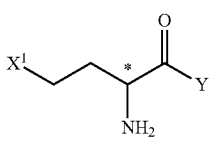
(II)

to a reaction with any one of the following compounds or mixtures: a compound of formula (IV); a compound of formula (V); a compound of formula (IV) and a compound of formula (V); a compound of formula (IV) and a compound of formula (VII); a compound of formula (V) and a compound of formula (VII); or a compound of formula (IV), a compound of formula (V), and a compound of formula (VII);

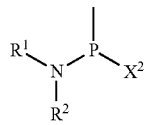
(IV)

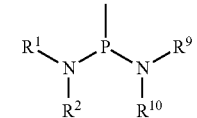
(V)

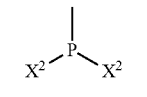
(VII)

where $X^1$, $X^2$, Y, $R^1$, $R^2$, $R^9$, $R^{10}$, and * are as defined above.

According to a fifth aspect, the present disclosure provides a method of preparing a compound of formula (III) or its salt or enantiomer, or a mixture of its enantiomers in any ratio,

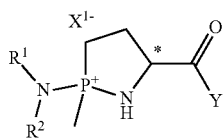
(III)

and the method includes preparing the compound of formula (III) from a reaction with the compound of formula (VI),

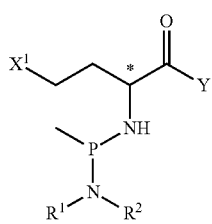
(VI)

where $X^1$, Y, $R^1$, $R^2$, and * are as defined above.

According to a sixth aspect, the present disclosure provides a compound of formula (VI) or its salt or enantiomer, or a mixture of its enantiomers in any ratio;

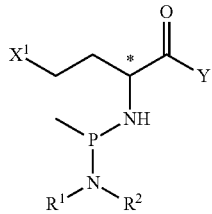
(VI)

where $X^1$, Y, $R^1$, $R^2$, and * are as defined above.

Preferably, the compound of formula (VI) can be prepared with reference to the first aspect of the present disclosure.

According to a seventh aspect, the present disclosure provides a method of preparing a compound of formula (VI) or its salt or enantiomer, or a mixture of its enantiomers in any ratio,

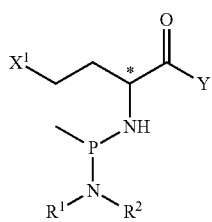
(VI)

and the method includes subjecting a compound of formula (II)

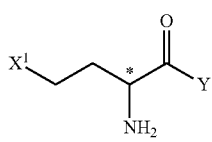
(II)

to a reaction with any one of the following compounds or mixtures: a compound of formula (IV); a compound of formula (V); a compound of formula (IV) and a compound of formula (V); a compound of formula (IV) and a compound of formula (VII); a compound of formula (V) and a compound of formula (VII); or a compound of formula (IV), a compound of formula (V), and a compound of formula (VII);

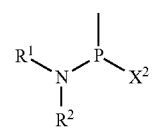
(IV)

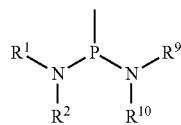
(V)

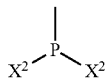
(VII)

where $X^1$, $X^2$, Y, $R^1$, $R^2$, $R^9$, $R^{10}$, and * are as defined above.

According to an eighth aspect, the present disclosure provides a method of preparing a compound of formula (VI) or its salt or enantiomer, or a mixture of its enantiomers in any ratio,

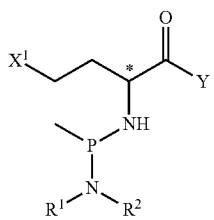
(VI)

and the method includes subjecting a compound of formula (II) to a reaction with a compound of formula (VII) and a compound of formula (VIII);

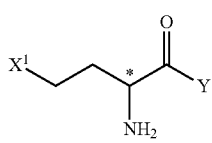
(II)

-continued

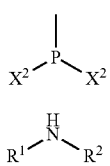
(VII)

$$R^1 \overset{H}{\underset{N}{\diagdown}} R^2$$
(VIII)

where $X^1$, $X^2$, $Y$, $R^1$, $R^2$, and * are as defined above.

According to a ninth aspect, the present disclosure provides a composition including a compound of formula (IV) and a compound of formula (V); a compound of formula (IV) and a compound of formula (VII); or a compound of formula (IV), a compound of formula (V), and a compound of formula (VII);

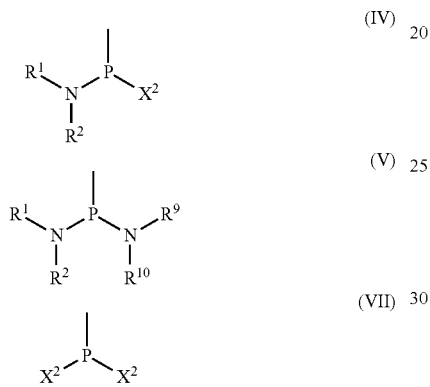

where $X^2$, $R^1$, $R^2$, $R^9$, $R^{10}$, and * are as defined above.

According to a tenth aspect, the present disclosure provides use of the composition in the ninth aspect in preparation of glufosinate represented by formula (I) or its salt or enantiomer, or a mixture of its enantiomers in any ratio:

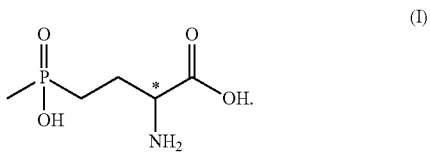

A person skilled in the art can understand that a definition and a preferred item described in one aspect of the present disclosure are also applicable to other aspects. A person skilled in the art can understand that the embodiments of various aspects of the present disclosure can be combined in various manners without departing from the subject and concept of the present disclosure, and these combinations also fall within the scope of the present disclosure.

Compared with the prior art, the present disclosure at least has advantageous effects in that:
1. Due to the distinctive reaction mechanism, the halogenated hydrocarbon by-product in the Michaelis-Arbuzov reaction can be avoided. The halogenated hydrocarbon by-product is usually ethyl chloride and methyl chloride, both of which are Class III carcinogens and have a destructive effect on ozone in the aerosphere. Accordingly, the equipment and engineering investments required for the separation, purification, and collection of the foregoing by-products are eliminated, and the potential environmental and safety hazards brought by the foregoing by-products are also avoided.
2. The reaction is milder than the Michaelis-Arbuzov reaction, and reaction temperature can be reduced by 30° C. to 80° C. compared with that in the Michaelis-Arbuzov reaction, and by virtue of this, racemization of the L configuration at high temperature can also be reduced when L-glufosinate is prepared, thereby improving purity of the L configuration product.
3. The source of the raw material is simplified, and methyldichlorophosphine is directly used as the raw material without using methyl phosphite diester as the intermediate, which reduces the cost of the raw material.

DETAILED DESCRIPTION

The present disclosure is further described below with reference to examples, but these examples are not intended to limit the scope of the present disclosure. Unless otherwise stated, all reactants used in the examples are commercially available; and instruments and devices used in synthesis experiments and product analyses and detection are all conventional instruments and devices commonly used in organic syntheses.

Example 1: Synthesis of L-Glufosinate Hydrochloride (I-1)

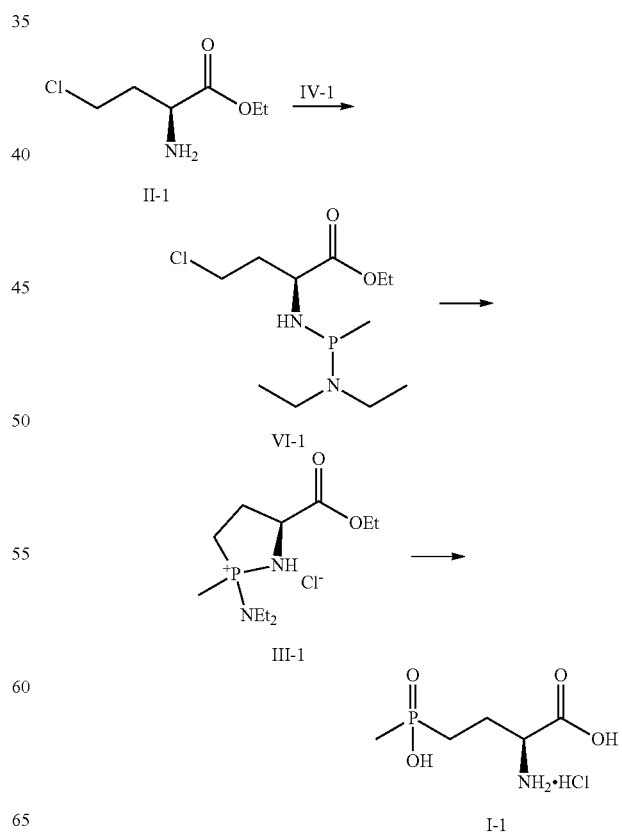

(1) Synthesis of Compound (IV-1)

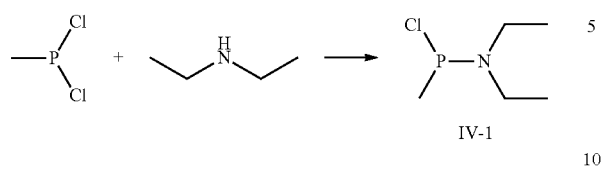

IV-1

Diethylamine (26.28 g, 0.359 mol, 2.1 eq.) was added into 100 g of toluene, the mixture was cooled to −5° C. to 5° C. in a nitrogen atmosphere, and methyldichlorophosphine (20 g, 0.171 mol, 1.0 eq.) was then added dropwise with the temperature of the mixture maintained at −5° C. to 5° C. After the addition was completed, compound (IV-1) was obtained and directly used for the next reaction after 0.5 hour of reaction at a constant temperature.

m/z (ESI) 154.08 ([M+1]$^+$, 100%); $^{31}$P NMR (33 MHz) δ: 144.57.

(2) Synthesis of Compound (VI-1)

In a nitrogen atmosphere, the compound (II-1) (26.92 g, 0.163 mol, 0.95 eq.) and diethylamine (11.89 g, 0.163 mol, 0.95 eq.) was added successively into 50 g of toluene. After stirring evenly, the above compound (IV-1) was added dropwise under ice bath cooling. The inner temperature of the reaction solution was controlled at 5 to 10° C., and the reaction was held for 2 hours after the dropwise addition was completed. Nitrogen pressure filtration was performed, and the filter cake was washed twice with toluene. The combined filtrate was the solution of compound (VI-1), which can be directly used for the next reaction.

m/z (ESI) 283.11 ([M+1]$^+$, 100%).

(3) Synthesis of Compound (III-1)

In a nitrogen atmosphere, the above compound (VI-1) solution was slowly heated to 80 to 85° C. for 10 hours to obtain a solution of compound (III-1), which can be directly used for the next reaction.

m/z (ESI) 247.18 ([M−Cl]$^+$, 100%); $^{31}$P NMR (33 MHz) δ: 71.40.

(4) Synthesis of Compound (I-1)

Added 150 g of 30% hydrochloric acid into the above compound (III-1) solution and heated it to 95 to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 30.1 g of the target product (I-1), yield: 83.5%, assay: 98.1%, and 97.3% ee value.

m/z (ESI) 182.07 ([M+1]$^+$, 100%);

$^{31}$P NMR (243 MHz, D$_2$O) δ: 53.67;

$^1$H NMR (600 MHz, D$_2$O) δ: 4.10 (t, J=6.1 Hz, 1H), 2.25-2.05 (m, 2H), 1.99-1.75 (m, 2H), 1.47 (d, J=14.1 Hz, 3H);

$^{13}$C NMR (151 MHz, D$_2$O) δ: 171.29, 52.96 (d, J=16.6 Hz), 25.25 (d, J=93.0 Hz), 22.72 (d, J=2.6 Hz), 13.61 (d, J=92.5 Hz).

Example 2: Synthesis of L-Glufosinate Hydrochloride (I-1)

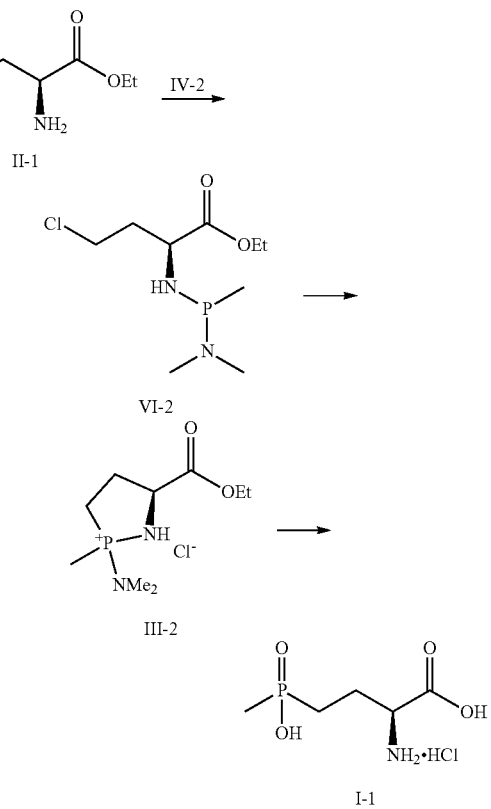

(1) Synthesis of Compound (IV-2)

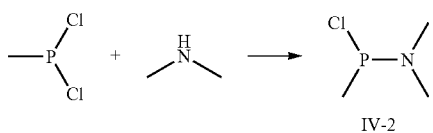

IV-2

Slowly added dimethylamine (16.20 g, 0.360 mol, 2.1 eq.) into 100 g of pre cooled toluene to −5° C. to 5° C. in a nitrogen atmosphere, and then methyldichlorophosphine (20 g, 0.171 mol, 1.0 eq.) was added dropwise with the temperature of the mixture maintained at −5° C. to 5° C. After the dropwise addition was completed, compound (IV-2) was obtained and directly used for the next reaction after 0.5 hour of reaction at a constant temperature.

m/z (ESI) 126.04 ([M+1]$^+$, 100%); $^{31}$P NMR (33 MHz) δ: 150.61.

(2) Synthesis of Compound (VI-2)

In a nitrogen atmosphere, the compound (II-1) (27.20 g, 0.164 mol, 0.96 eq.) was added into 50 g of toluene. Dimethylamine (7.41 g, 0.164 mol, 0.96 eq.) was slowly added under ice bath cooling, and the inner temperature of the reaction solution was controlled at 5° C. to 10° C., then the above compound (IV-2) solution was added dropwise.

The reaction was held for 2 hours after the dropwise addition was completed. Nitrogen pressure filtration was performed, and the filter cake was washed twice with toluene. The combined filtrate was the solution of compound (VI-2), which can be directly used for the next reaction.

m/z (ESI) 255.12 ([M+1]⁺, 100%).

(3) Synthesis of Compound (III-2)

In a nitrogen atmosphere, the above compound (VI-2) solution was slowly heated to 80° C. to 85° C. for 7 hours to obtain a solution of compound (III-2), which can be directly used for the next reaction.

m/z (ESI) 219.14 ([M−Cl]⁺, 100%); ³¹P NMR (33 MHz) δ: 78.20.

(4) Synthesis of Compound (I-1)

Added 150 g of 30% hydrochloric acid into the above compound (III-2) solution and heated it to 95° C. to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 28.7 g of the target product (I-1), yield: 78.5%, assay: 97.6%, and 95.3% ee value.

Example 3: Synthesis of L-Glufosinate Hydrochloride (I-1)

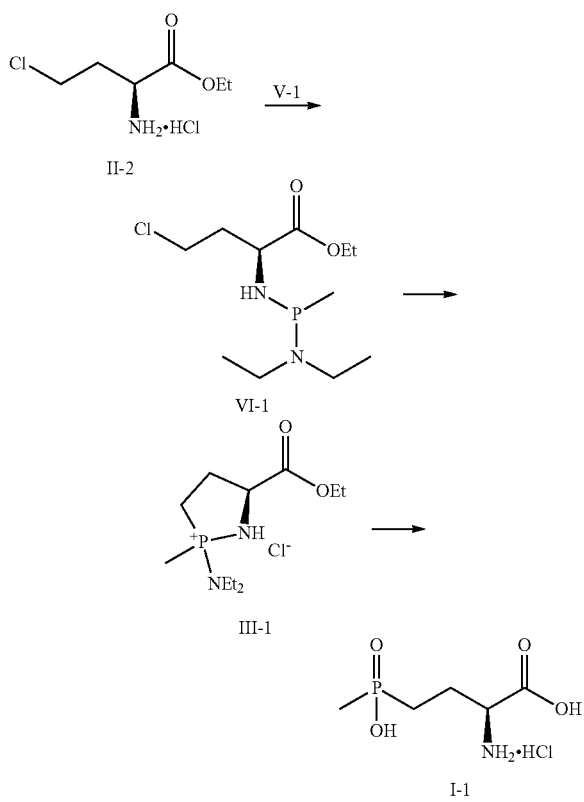

(1) Synthesis of Compound (V-1)

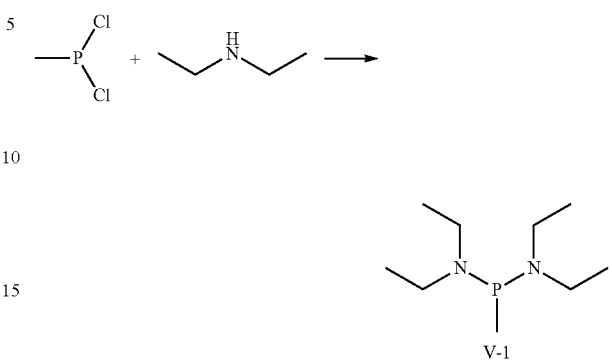

Diethylamine (51.30 g, 0.701 mol, 4.1 eq.) was added into 150 g of toluene, the mixture was cooled to −5° C. to 5° C. in a nitrogen atmosphere, and methyldichlorophosphine (20 g, 0.171 mol, 1.0 eq.) was then added dropwise with the temperature of the mixture maintained at −5° C. to 5° C. After the dropwise addition was completed, compound (V-1) was obtained and directly used for the next reaction after 0.5 hour of reaction at a constant temperature.

m/z (ESI) 191.17 ([M+1]⁺, 100%); ³¹P NMR (33 MHz) δ: 79.29.

(2) Synthesis of Compound (VI-1)

In a nitrogen atmosphere, the compound (II-2) (32.84 g, 0.163 mol, 0.95 eq.) was added into 50 g of toluene, and the above compound (V-1) was added dropwise under ice bath cooling. The inner temperature of the reaction solution was controlled at 5° C. to 10° C. The reaction was held for 2 hours after the dripping was completed. Nitrogen pressure filtration was performed, and the filter cake was washed twice with toluene. The combined filtrate was the solution of compound (VI-1), which can be directly used for the next reaction.

m/z (ESI) 283.13 ([M+1]⁺, 100%).

(3) Synthesis of Compound (III-1)

In a nitrogen atmosphere, the above compound (VI-1) solution was slowly heated to 80 to 85° C. for 10 hours to obtain a solution of compound (III-1), which can be directly used for the next reaction.

m/z (ESI) 247.17 ([M−Cl]⁺, 100%); ³¹P NMR (33 MHz) δ: 71.10.

(4) Synthesis of Compound (I-1)

Added 150 g of 30% hydrochloric acid into the above compound (III-1) solution and heated it to 95° C. to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 26.7 g of the target product (I-1), yield: 73.5%, assay: 97.5%, and 97.5% ee value.

Example 4: Synthesis of L-Glufosinate Hydrochloride (I-1)

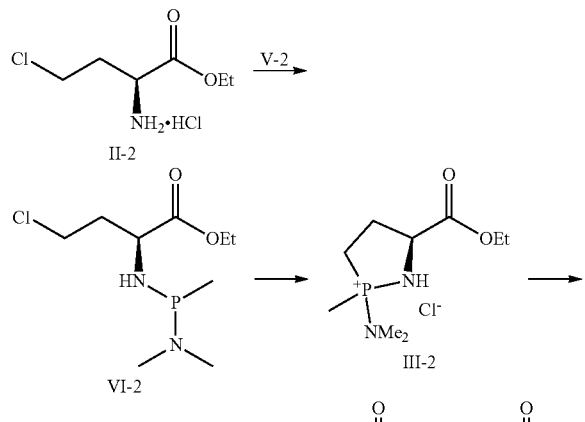

(1) Synthesis of Compound (V-2)

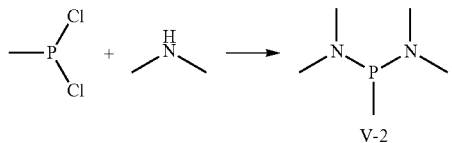

Slowly added dimethylamine (31.63 g, 0.701 mol, 4.1 eq.) into 150 g of toluene while lowering the temperature to −5° C. to 5° C. under nitrogen protection. methyldichlorophosphine (20 g, 0.171 mol, 1.0 eq.) was added dropwise while maintaining the system temperature at −5° C. to 5° C. After the dropwise addition was completed, compound (V-2) was obtained and directly used for the next reaction after 0.5 hour of reaction at a constant temperature.

m/z (ESI) 135.09 ([M+1]$^+$, 100%); $^{31}$P NMR (33 MHz) δ: 87.63.

(2) Synthesis of Compound (VI-2)

In a nitrogen atmosphere, the compound (II-2) (32.84 g, 0.163 mol, 0.95 eq.) was added into 50 g of toluene, and the above compound (V-2) was added dropwise under ice bath cooling. The inner temperature of the reaction solution was controlled at 5° C. to 10° C. The reaction was held for 2 hours after the dropwise addition was completed. Nitrogen pressure filtration was performed, and the filter cake was washed twice with toluene. The combined filtrate was the solution of compound (VI-2), which can be directly used for the next reaction.

m/z (ESI) 255.11 ([M+1]$^+$, 100%).

(3) Synthesis of Compound (III-2)

In a nitrogen atmosphere, the above compound (VI-2) solution was slowly heated to 80° C. to 85° C. for 8 hours to obtain a solution of compound (III-2), which can be directly used for the next reaction.

m/z (ESI) 219.12 ([M−Cl]$^+$, 100%); $^{31}$P NMR (33 MHz) δ: 77.90.

(4) Synthesis of Compound (I-1)

Added 150 g of 30% hydrochloric acid into the above compound (III-2) solution and heated it to 95° C. to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 25.9 g of the target product (I-1), yield: 70.5%, assay: 96.2%, and 97.3% ee value.

Example 5: Synthesis of DL-glufosinate hydrochloride (I-2)

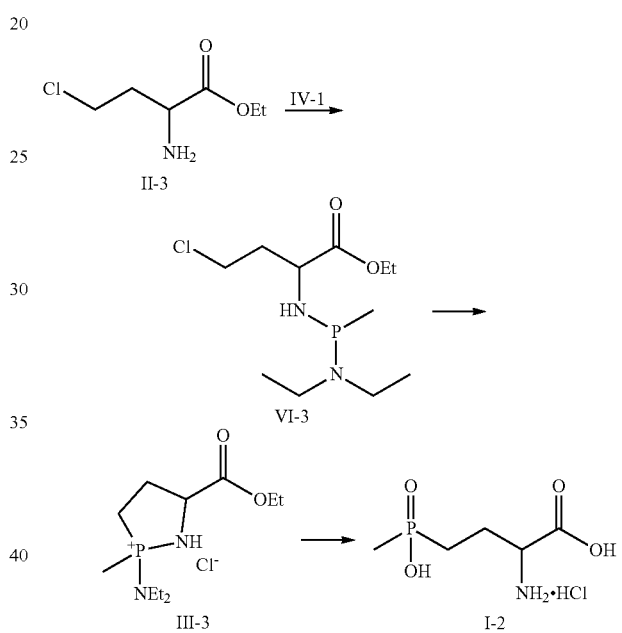

(1) Synthesis of Compound (IV-1)

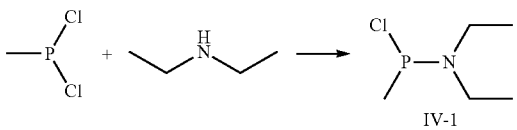

Diethylamine (27.53 g, 0.376 mol, 2.2 eq.) was added into 100 g of toluene, the mixture was cooled to −5° C. to 5° C. in a nitrogen atmosphere, and methyldichlorophosphine (20 g, 0.171 mol, 1.0 eq.) was then added dropwise with the temperature of the mixture maintained at −5° C. to 5° C. After the addition was completed, compound (IV-1) was obtained and directly used for the next reaction after 0.5 hour of reaction at a constant temperature.

(2) Synthesis of Compound (VI-3)

In a nitrogen atmosphere, the compound (II-3) (27.77 g, 0.168 mol, 0.98 eq.) and diethylamine (12.26 g, 0.168 mol, 0.98 eq.) was added successively into 50 g of toluene. After stirring evenly, the above compound (IV-1) was added dropwise under ice bath cooling. The inner temperature of the reaction solution was controlled at 5° C. to 10° C., and the reaction was held for 2 hours after the addition was completed. Nitrogen pressure filtration was performed, and the filter cake was washed twice with toluene. The combined filtrate was the solution of compound (VI-3), which can be directly used for the next reaction.

(3) Synthesis of Compound (III-3)

In a nitrogen atmosphere, the above compound (VI-3) solution was slowly heated to 80° C. to 85° C. for 10 hours to obtain a solution of compound (III-3), which can be directly used for the next reaction.

(4) Synthesis of Compound (I-2)

Added 150 g of 30% hydrochloric acid into the above compound (III-3) solution and heated it to 95 to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 30.2 g of the target product (I-2), yield: 81.5%, assay: 98.5%.

Example 6: Synthesis of DL-Glufosinate Hydrochloride (I-2)

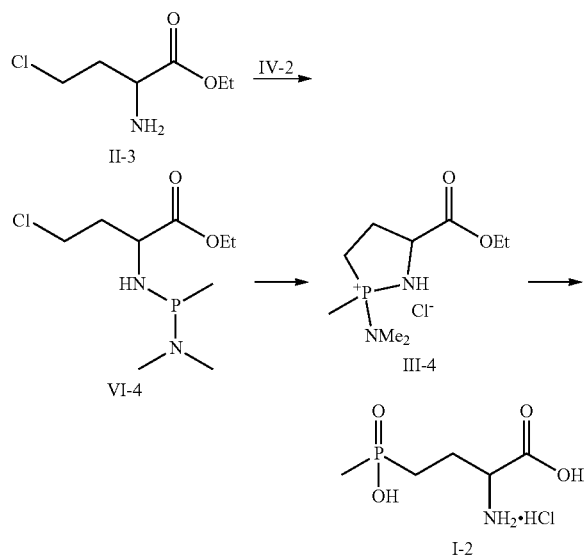

(1) Synthesis of Compound (IV-2)

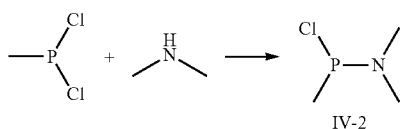

Slowly added dimethylamine (16.20 g, 0.359 mol, 2.1 eq.) into 100 g of toluene while lowering the temperature to −5 to 5° C. under nitrogen protection. methyldichlorophosphine (20 g, 0.171 mol, 1.0 eq.) was added dropwise while maintaining the system temperature at −5 to 5° C. After the addition was completed, compound (IV-2) was obtained and directly used for the next reaction after 0.5 hour of reaction at a constant temperature.

(2) Synthesis of Compound (VI-4)

In a nitrogen atmosphere, the compound (II-3) (27.48 g, 0.166 mol, 0.97 eq.) was added into 50 g of toluene, then dimethylamine (7.48 g, 0.166 mol, 0.97 eq.) was slowly added under ice bath cooling, the inner temperature of the reaction solution was controlled at 5° C. to 10° C., then the above compound (IV-2) solution was added dropwise. The reaction was held for 2 hours after the dripping was completed. Nitrogen pressure filtration was performed, and the filter cake was washed twice with toluene. The combined filtrate was the solution of compound (VI-4), which can be directly used for the next reaction.

(3) Synthesis of Compound (III-4)

In a nitrogen atmosphere, the above compound (VI-4) solution was slowly heated to 80° C. to 85° C. for 6 hours to obtain a solution of compound (III-4), which can be directly used for the next reaction.

(4) Synthesis of Compound (I-2)

Added 150 g of 30% hydrochloric acid into the above compound (III-4) solution and heated it to 95° C. to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 28.9 g of the target product (I-2), yield: 77.5%, assay: 96.8%.

Example 7: Synthesis of DL-Glufosinate Hydrochloride (I-2)

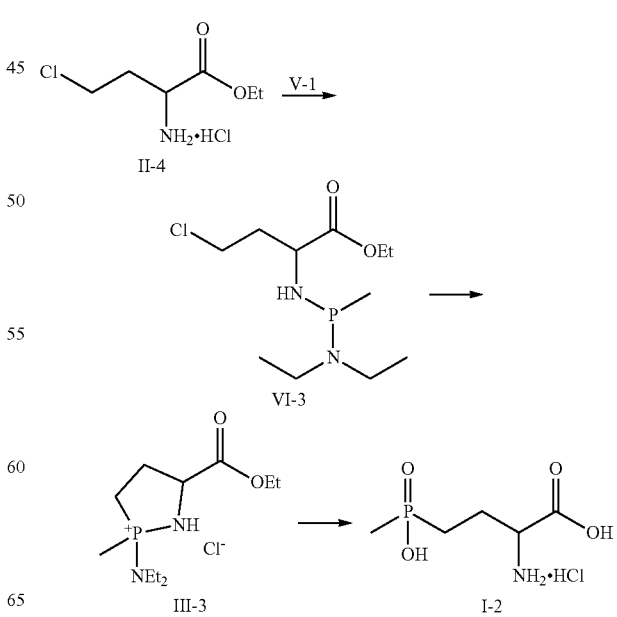

(1) Synthesis of Compound (V-1)

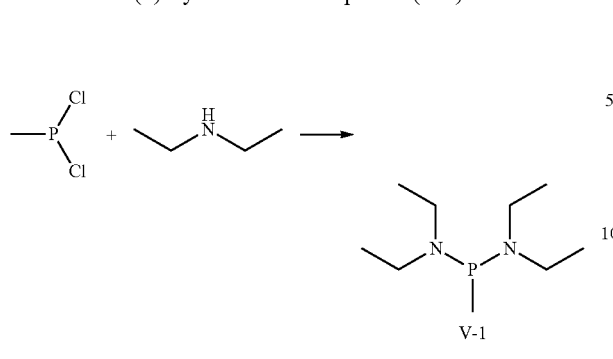

Diethylamine (52.55 g, 0.719 mol, 4.2 eq.) was added into 150 g of toluene, the mixture was cooled to −5° C. to 5° C. in a nitrogen atmosphere, and methyldichlorophosphine (20 g, 0.171 mol, 1.0 eq.) was then added dropwise with the temperature of the mixture maintained at −5° C. to 5° C. After the addition was completed, compound (V-1) was obtained and directly used for the next reaction after 0.5 hour of reaction at a constant temperature.

(2) Synthesis of Compound (VI-3)

In a nitrogen atmosphere, the compound (II-4) (32.84 g, 0.163 mol, 0.95 eq.) was added into 50 g of toluene, and the above compound (V-1) was added dropwise under ice bath cooling. The inner temperature of the reaction solution was controlled at 5° C. to 10° C. The reaction was held for 2 hours after the addition was completed. Nitrogen pressure filtration was performed, and the filter cake was washed twice with toluene. The combined filtrate was the solution of compound (VI-3), which can be directly used for the next reaction.

(3) Synthesis of Compound (III-3)

In a nitrogen atmosphere, the above compound (VI-3) solution was slowly heated to 80 to 85° C. for 10 hours to obtain a solution of compound (III-3), which can be directly used for the next reaction.

(4) Synthesis of Compound (I-2)

Added 150 g of 30% hydrochloric acid into the above compound (III-3) solution and heated it to 95° C. to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 25.7 g of the target product (I-2), yield: 71.1%, assay: 97.8%.

Example 8: Synthesis of DL-Glufosinate Hydrochloride (I-2)

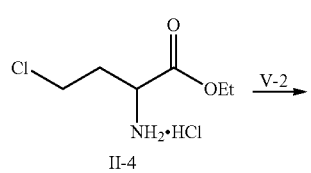

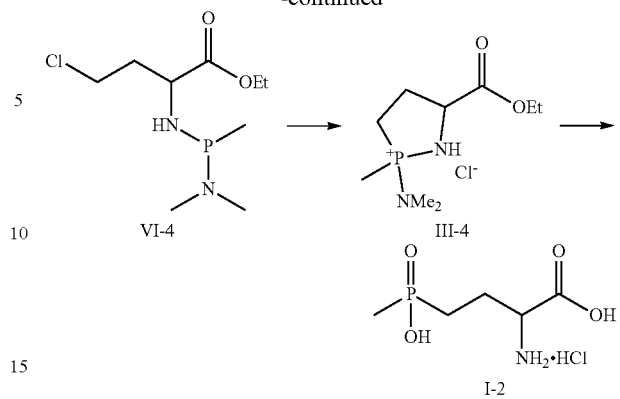

(1) Synthesis of Compound (V-2)

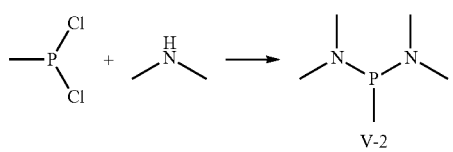

Dimethylamine (31.24 g, 0.693 mol, 4.05 eq.) was slowly added into 150 g of toluene, the mixture was cooled to −5° C. to 5° C. in a nitrogen atmosphere, and methyldichlorophosphine (20 g, 0.171 mol, 1.0 eq.) was then added dropwise with the temperature of the mixture maintained at −5° C. to 5° C. After the addition was completed, compound (V-2) was obtained and directly used for the next reaction after 0.5 hour of reaction at a constant temperature.

(2) Synthesis of Compound (VI-4)

In a nitrogen atmosphere, the compound (II-4) (32.84 g, 0.163 mol, 0.95 eq.) was added into 50 g of toluene, and the above compound (V-2) was added dropwise under ice bath cooling. The inner temperature of the reaction solution was controlled at 5° C. to 10° C. The reaction was held for 2 hours after the dropwise addition was completed. Nitrogen pressure filtration was performed, and the filter cake was washed twice with toluene. The combined filtrate was the solution of compound (VI-4), which can be directly used for the next reaction.

(3) Synthesis of Compound (III-4)

In a nitrogen atmosphere, the above compound (VI-4) solution was slowly heated to 80° C. to 85° C. for 8 hours to obtain a solution of compound (III-4), which can be directly used for the next reaction.

(4) Synthesis of Compound (I-2)

Added 150 g of 30% hydrochloric acid into the above compound (III-4) solution and heated it to 95 to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 26.4 g of the target product (I-2), yield: 72.5%, assay: 97.2%.

Example 9: Synthesis of L-Glufosinate Hydrochloride (I-1)

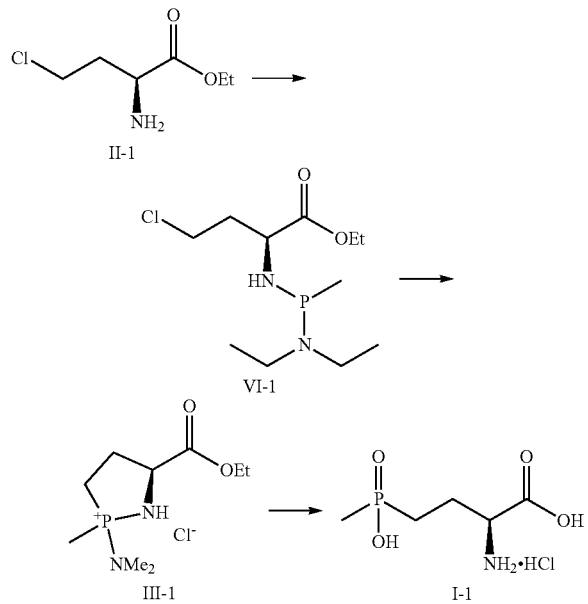

(1) Synthesis of Compound (VI-1)

In a nitrogen atmosphere, the compound (II-1) (40.37 g, 0.244 mol, 0.95 eq.) and diethylamine (57.24 g, 0.783 mol, 3.05 eq.) was added successively into 150 g of toluene. After stirring evenly, methyldichlorophosphine (30.0 g, 0.257 mol, 1.0 eq.) was then added dropwise under ice bath cooling. The inner temperature of the reaction solution was controlled at 5 to 10° C. The reaction was held for 2 hours after the dropwise addition was completed, nitrogen pressure filtration was then performed, and the filter cake was washed twice with toluene. The combined filtrate was the solution of compound (VI-1), which can be directly used for the next reaction.

(2) Synthesis of Compound (III-1)

In a nitrogen atmosphere, the above compound (VI-1) solution was slowly heated to 80 to 85° C. for 10 hours to obtain a solution of compound (III-1), which can be directly used for the next reaction.

(3) Synthesis of Compound (I-1)

Added 150 g of 30% hydrochloric acid into the above compound (III-1) solution and heated it to 95 to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 46.0 g of the target product (I-1), yield: 85.5%, assay: 98.5%, and 97.5% ee value.

Example 10: Synthesis of L-Glufosinate Hydrochloride (I-1)

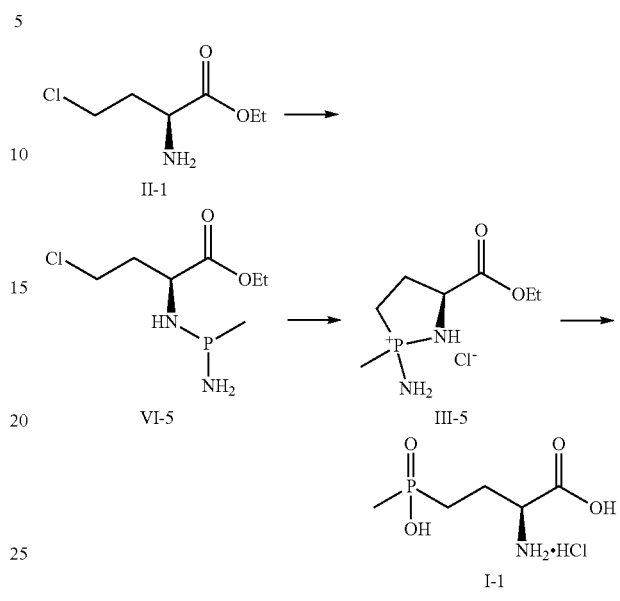

(1) Synthesis of Compound (VI-5)

In a nitrogen atmosphere, the compound (II-1) (33.78 g, 0.204 mol, 0.95 eq.) was added into 150 g of toluene. Methyldichlorophosphine (25.1 g, 0.215 mol, 1.0 eq.) was then added dropwise under ice bath cooling, simultaneously ammonia gas (18.46 g, 1.084 mol, 5.05 eq.) was slowly Injected into the mixture. The inner temperature of the reaction solution was controlled at 5° C. to 10° C. The reaction was held for 2 hours after the dropwise addition was completed, nitrogen pressure filtration was then performed, and the filter cake was washed twice with toluene. The combined filtrate was the solution of compound (VI-5), which can be directly used for the next reaction.

m/z (ESI) 227.07 ([M+1]$^+$, 100%).

(2) Synthesis of Compound (III-5)

In a nitrogen atmosphere, the above compound (VI-5) solution was slowly heated to 60° C. to 65° C. for 10 hours to obtain a solution of compound (III-5), which can be directly used for the next reaction.

m/z (ESI) 191.11 ([M−Cl]$^+$, 100%);

(3) Synthesis of Compound (I-1)

Added 150 g of 30% hydrochloric acid into the above compound (III-5) solution and heated it to 95 to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 31.5 g of the target product (I-1), yield: 69.5%, assay: 97.5%, and 97.2% ee value.

Example 11: Synthesis of L-glufosinate hydrochloride (I-1)

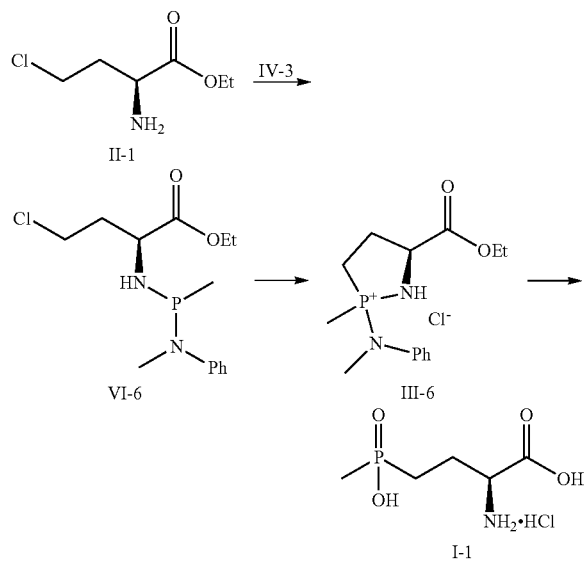

(1) Synthesis of Compound (IV-3)

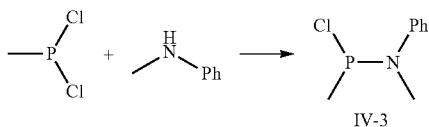

N-methylaniline (50.73 g, 0.473 mol, 2.05 eq.) was dissolved in 100 g toluene, and cooled to −5° C. to 5° C. under inert atmosphere, then methyldichlorophosphine (27 g, 0.231 mol, 1.0 eq.) was added dropwise while maintaining the inner temperature at −5° C. to 5° C. After the addition was completed, the compound (IV-3) was obtained and directly used for the next reaction after 0.5 hour of reaction at a constant temperature.

m/z (CI) 188.05 ([M+1]$^+$, 100%); $^{31}$P NMR (33 MHz) δ: 140.51.

(2) Synthesis of Compound (VI-6)

In a nitrogen atmosphere, the compound (II-1) (37.48 g, 0.226 mol, 0.98 eq.) was added into 50 g of toluene, and N-methylaniline (24.25 g, 0.226 mol, 0.98 eq.) was added. After stirring evenly, the above compound (IV-3) solution was added dropwise under ice bath cooling, the inner temperature of the reaction solution was controlled at 5° C. to 10° C. The reaction was held for 5 hours after dropwise addition was completed. Nitrogen pressure filtration was performed, and the filter cake was washed twice with toluene. The combined filtrate was the solution of compound (VI-6), which can be directly used for the next reaction.

m/z (ESI) 317.13 ([M+1]$^+$, 100%).

(3) Synthesis of Compound (III-6)

In a nitrogen atmosphere, the above compound (VI-6) solution was slowly heated to 80 to 85° C. for 12 hours to obtain a solution of compound (III-6), which can be directly used for the next reaction.

m/z (ESI) 281.15 ([M−Cl]$^+$, 100%); $^{31}$P NMR (33 MHz) δ: 60.31.

(4) Synthesis of Compound (I-1)

Added 150 g of 30% hydrochloric acid into the above compound (III-6) solution and heated it to 95 to 105° C. for reaction. After the reaction was completed, the resulting mixture was distilled under reduced pressure, and then 150 g of absolute ethanol was added, the mixture was briefly boiled and cooled to crystallize, filtered and dried to obtain a white crystal, namely, 36.1 g of the target product (I-1), yield: 71.5%, assay: 97.5%, and 96.1% ee value.

The preferred embodiments of the present disclosure have been described in detail above. However, the present disclosure is not limited to the specific details in the above embodiments. Within the scope of the technical concept of the present disclosure, many simple modifications can be made to the technical solution of the present disclosure, all of which fall within the claimed scope of the present disclosure.

Furthermore, it should be noted that various specific technical features described in the above specific embodiments can be combined in any suitable way without contradiction. In order to avoid unnecessary repetition, the present disclosure will not explain various possible combinations separately.

Furthermore, any combination can be made among various embodiments of the present disclosure, as long as it does not violate the idea of the present disclosure, it should also be regarded as the disclosure of the present disclosure.

What is claimed is:

1. A method of preparing glufosinate represented by formula (I) or its salt or enantiomer, or a mixture of its enantiomers in any ratio, comprising:

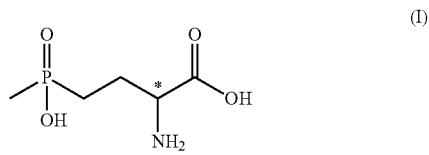

(I)

hydrolyzing a compound of formula (III) to generate a compound of formula (I);

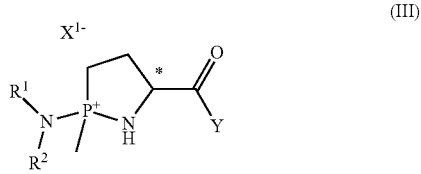

(III)

wherein:

X¹ is halogen;

Y is —OR³ or —N(R⁴)(R⁵);

R¹ and R² are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or R¹ and R² form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group;

R³, R⁴, and R⁵ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or R⁴ and R⁵ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group; and

* denotes a chiral carbon atom.

2. The method of claim 1, wherein the hydrolysis is performed in presence of an acid or an alkali.

3. The method of claim 2, wherein the acid is at least one selected from hydrochloric acid, sulfuric acid, hydrobromic acid, hydroiodic acid, phosphoric acid, nitric acid, formic acid, and acetic acid.

4. The method of claim 2, wherein the alkali is selected from hydroxide, carbonate, bicarbonate or basic carbonate of alkali metal or alkaline earth metal, ammonia, organic alkali, or organic amine.

5. The method of claim 1, wherein the hydrolysis is performed at a temperature of 30° C. to 140° C.

6. The method of claim 1, wherein the enantiomer of the glufosinate is L-glufosinate or D-glufosinate.

7. The method of claim 1, wherein the mixture of its enantiomers in any ratio comprises L-glufosinate and D-glufosinate in a ratio of 0.1:99.9 to 99.9:0.1.

8. The method of claim 1, wherein the halogen is selected from fluorine, chlorine, or bromine;

the $C_1$-$C_6$ alkyl group is selected from a methyl group, an ethyl group, a propyl group, or an isopropyl group;

the $C_2$-$C_6$ alkenyl group is selected from a vinyl group, a propenyl group, a 1-butenyl group, a 2-butenyl group, or an isobutenyl group;

the $C_2$-$C_6$ alkynyl group is selected from an ethynyl group, a propynyl group, a 1-butynyl group, or 2-butynyl group;

the $C_3$-$C_6$ cycloalkyl group is selected from a cyclopropyl group, a cyclobutyl group, a cyclopentyl group, or a cyclohexyl group;

the three-membered to six-membered heterocycloalkyl group is selected from a cyclopropyl group, a cyclobutyl group, a cyclopentyl group, or a cyclohexyl group comprising at least one heteroatom of N, O, or S;

the $C_6$-$C_{10}$ aryl group is selected from a phenyl group or a naphthyl group; and/or the five-membered to ten-membered heteroaryl group is selected from a pyrazinyl group, a pyrazolyl group, a pyrrolyl group, a furyl group, a thienyl group, a thiazolyl group, or a pyridyl group.

9. The method of claim 1, wherein R¹, R², R³, R⁴, and R⁵ are each independently selected from hydrogen, a $C_1$-$C_6$ alkyl group, or a $C_3$-$C_6$ cycloalkyl group.

10. The method of claim 1, wherein the compound of formula (III) is prepared by subjecting a compound of formula (II)

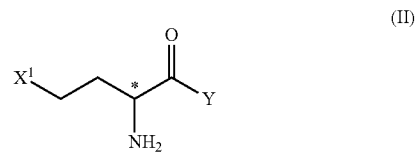

(II)

to a reaction with any one of the following compounds or mixtures: a compound of formula (IV); a compound of formula (V); a compound of formula (IV) and a compound of formula (V); a compound of formula (IV) and a compound of formula (VII); a compound of formula (V) and a compound of formula (VII); or a compound of formula (IV), a compound of formula (V), and a compound of formula (VII);

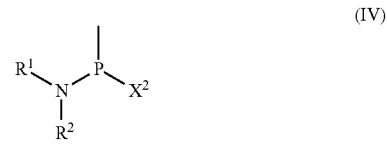

(IV)

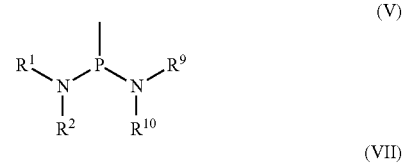

(V)

(VII)

wherein:

X² is halogen;

R¹, R², X¹, Y, and * are as defined in claim 1; and

R⁹ and R¹⁰ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or R⁹ and R¹⁰ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group.

11. The method of claim 10, wherein the reaction is performed in the presence of a deacid reagent.

12. The method of claim 11, wherein the deacid reagent is selected from $NR^{11}R^{12}R^{13}$, wherein $R^{11}$, $R^{12}$, and $R^{13}$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or any two of $R^{11}$, $R^{12}$, and $R^{13}$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group.

13. The method of claim 11, wherein a molar ratio among the compound of formula (II), total usage of the compounds of formulas (IV), (V) and (VII), and the deacid reagent is 1:(0.9-5):(0.9-5).

14. The method of claim 10, wherein the reaction is performed in the absence of a solvent or in presence of an organic solvent.

15. The method of claim 14, wherein the organic solvent is selected from an aromatic hydrocarbon solvent, an alkane solvent, a halogenated hydrocarbon solvent, an ether solvent, an ester solvent, an amide solvent, or a sulfur-containing solvent.

16. The method of claim 10, wherein the reaction is performed at a temperature of −20° C. to 10° C. for 1 to 15 hours, and then at 10° C. to 120° C. for 0.5 to 24 hours.

17. The method of claim 10, wherein the compound of formula (III) is prepared by a method comprising the following steps:

a) subjecting a compound of formula (II)

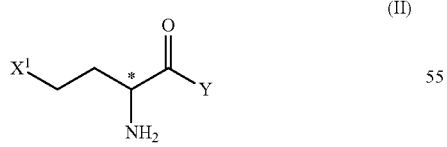

(II)

to a reaction with any one of the following compounds or mixtures: a compound of formula (IV); a compound of formula (V); a compound of formula (IV) and a compound of formula (V); a compound of formula (IV) and a compound of formula (VII); a compound of formula (V) and a compound of formula (VII); or a compound of formula (IV), a compound of formula (V), and a compound of formula (VII);

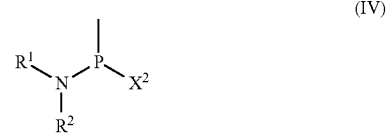

(IV)

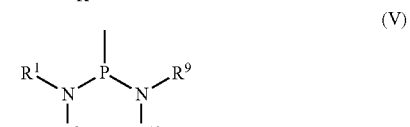

(V)

(VII)

to obtain a compound of formula (VI);

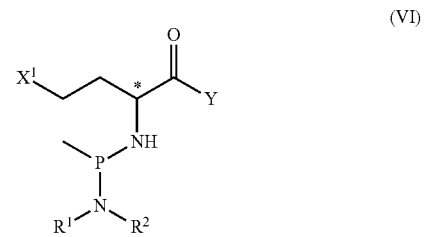

(VI)

and b) preparing the compound of formula (III) via a reaction with the compound of formula (VI).

18. The method of claim 17, wherein the reaction in step a) is performed at a temperature of −20° C. to 10° C. for 1 to 15 hours.

19. The method of claim 17, wherein the reaction in step b) is performed at a temperature of 10° C. to 120° C. for 0.5 to 24 hours.

20. A method of preparing glufosinate represented by formula (I) or its salt or enantiomer, or a mixture of its enantiomers in any ratio, comprising the following steps:

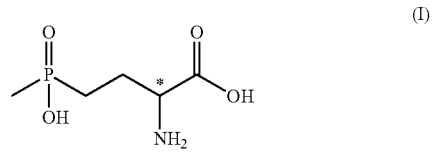

(I)

in absence of a solvent or in presence of an organic solvent, subjecting a compound of formula (II)

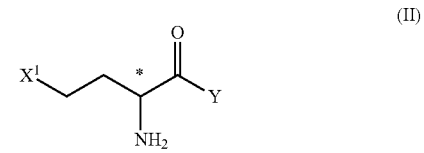

(II)

to a reaction with any one of the following compounds or mixtures: a compound of formula (IV); a compound of formula (V); a compound of formula (IV) and a compound of formula (V); a compound of formula (IV) and a compound of formula (VII); a compound of formula (V) and a compound of formula (VII); or a compound of formula (IV), a compound of formula (V), and a compound of formula (VII), to obtain an intermediate; and

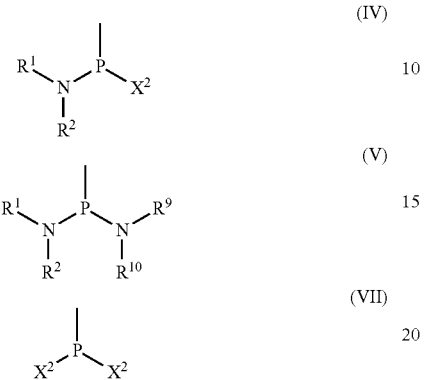

hydrolyzing the intermediate under an acidic, neutral, or alkaline condition, to obtain a compound of formula (I);

wherein $X^1$, $X^2$, Y, $R^1$, $R^2$, $R^9$, $R^{10}$, and * are as defined in claim 1.

21. A compound of formula (III) or its salt or enantiomer, or a mixture of its enantiomers in any ratio;

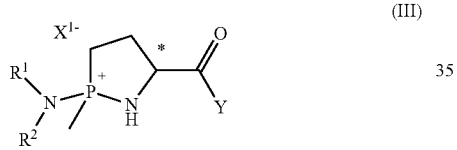

wherein:

$X^1$ is halogen;

Y is —$OR^3$ or —$N(R^4)(R^5)$;

$R^1$ and $R^2$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^1$ and $R^2$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group;

$R^3$, $R^4$, and $R^5$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^4$ and $R^5$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group; and

* denotes a chiral carbon atom.

22. A method of preparing a compound of formula (III) or its salt or enantiomer, or a mixture of its enantiomers in any ratio, comprising:

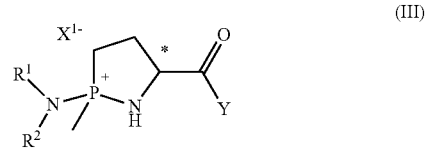

subjecting a compound of formula (II)

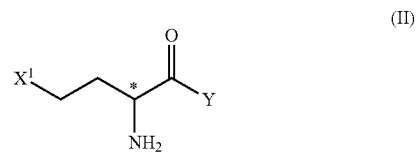

to a reaction with any one of the following compounds or mixtures: a compound of formula (IV); a compound of formula (V); a compound of formula (IV) and a compound of formula (V); a compound of formula (IV) and a compound of formula (VII); a compound of formula (V) and a compound of formula (VII); or a compound of formula (IV), a compound of formula (V), and a compound of formula (VII);

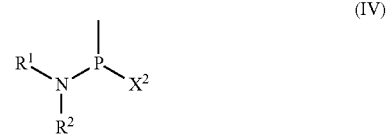

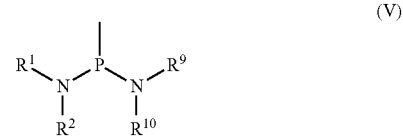

wherein:

$X^1$ is halogen;

$X^2$ is halogen;

Y is —$OR^3$ or —$N(R^4)(R^5)$;

$R^1$ and $R^2$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^1$ and $R^2$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group;

$R^3$, $R^4$, and $R^5$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^4$ and $R^5$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group;

$R^9$ and $R^{10}$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^9$ and $R^{10}$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group; and

* denotes a chiral carbon atom.

23. A method of preparing a compound of formula (III) or its salt or enantiomer, or a mixture of its enantiomers in any ratio, comprising:

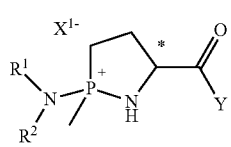

(III)

preparing the compound of formula (III) from a reaction with the compound of formula (VI);

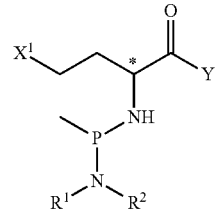

(VI)

wherein:
$X^1$ is halogen;
Y is —$OR^3$ or —$N(R^4)(R^5)$;
$R^1$ and $R^2$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^1$ and $R^2$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group;

$R^3$, $R^4$, and $R^5$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^4$ and $R^5$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group; and

* denotes a chiral carbon atom.

24. A compound of formula (VI) or its salt or enantiomer, or a mixture of its enantiomers in any ratio;

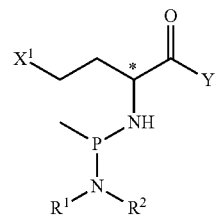

(VI)

wherein:

$X^1$ is halogen;

Y is —$OR^3$ or —$N(R^4)(R^5)$;

$R^1$ and $R^2$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^1$ and $R^2$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group;

$R^3$, $R^4$, and $R^5$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^4$ and $R^5$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group; and

* denotes a chiral carbon atom.

25. A method of preparing a compound of formula (VI) or its salt or enantiomer, or a mixture of its enantiomers in any ratio, comprising:

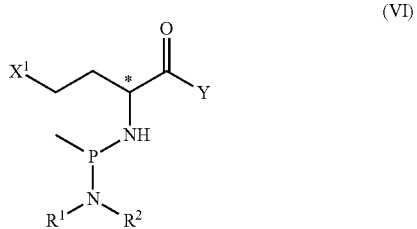

(VI)

subjecting a compound of formula (II)

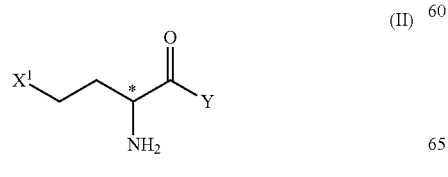

(II)

to a reaction with any one of the following compounds or mixtures: a compound of formula (IV); a compound of formula (V); a compound of formula (IV) and a compound of formula (V); a compound of formula (IV) and a compound of formula (VII); a compound of formula (V) and a compound of formula (VII); or a compound of formula (IV), a compound of formula (V), and a compound of formula (VII);

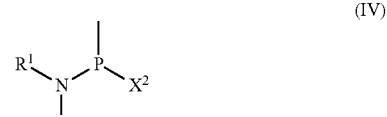

(IV)

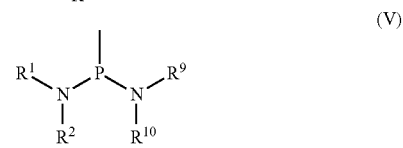

(V)

(VII)

wherein:

$X^1$ is halogen;

$X^2$ is halogen;

Y is —$OR^3$ or —$N(R^4)(R^5)$;

$R^1$ and $R^2$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^1$ and $R^2$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group;

$R^3$, $R^4$, and $R^5$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^4$ and $R^5$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group;

$R^9$ and $R^{10}$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^9$ and $R^{10}$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group; and

* denotes a chiral carbon atom.

26. A method of preparing a compound of formula (VI) or its salt or enantiomer, or a mixture of its enantiomers in any ratio, comprising:

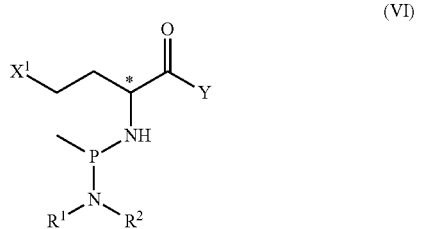

(VI)

subjecting a compound of formula (II);

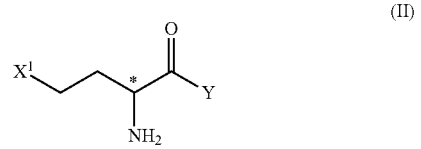

(II)

to a reaction with a compound of formula (VII) and a compound of formula (VIII);

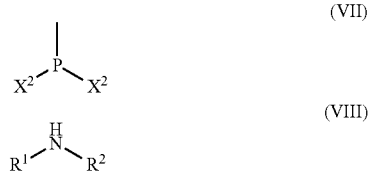

(VII)

(VIII)

wherein:
$X^1$ is halogen;
$X^2$ is halogen;
Y is —$OR^3$ or —$N(R^4)(R^5)$;
$R^1$ and $R^2$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^1$ and $R^2$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group;
$R^3$, $R^4$, and $R^5$ are each independently selected from hydrogen, a $C_1$-$C_6$ alkyl group, a $C_2$-$C_6$ alkenyl group, a $C_2$-$C_6$ alkynyl group, a $C_3$-$C_6$ cycloalkyl group, a three-membered to six-membered heterocycloalkyl group, a $C_6$-$C_{10}$ aryl group, or a five-membered to ten-membered heteroaryl group, or $R^4$ and $R^5$ form a three-membered to six-membered heterocycloalkyl group together with the N atom to which they are attached, wherein the $C_1$-$C_6$ alkyl group, the $C_2$-$C_6$ alkenyl group, the $C_2$-$C_6$ alkynyl group, the $C_3$-$C_6$ cycloalkyl group, the three-membered to six-membered heterocycloalkyl group, the $C_6$-$C_{10}$ aryl group, or the five-membered to ten-membered heteroaryl group is optionally substituted by halogen, a carboxyl group, a hydroxyl group, a cyano group, an amino group, a nitro group, a $C_1$-$C_3$ alkyl group, a $C_1$-$C_3$ haloalkyl group, a $C_1$-$C_3$ alkoxy group, a $C_3$-$C_6$ cycloalkyl group, or a $C_6$-$C_{10}$ aryl group; and

* denotes a chiral carbon atom.

27. The method of claim 3, wherein the acid is selected from hydrochloric acid or sulfuric acid.

28. The method of claim 4, wherein the alkali is selected from sodium hydroxide or triethylamine.

29. The method of claim 5, wherein the hydrolysis is performed at a temperature of 70° C. to 110° C.

30. The method of claim 7, wherein the mixture of its enantiomers in any ratio comprises L-glufosinate and D-glufosinate in a ratio of 50:50 to 99.9:0.1.

31. The method of claim 9, wherein $R^1$, $R^2$, $R^3$, $R^4$, and $R^5$ are each independently selected from hydrogen, a methyl group, an ethyl group, a propyl group, an isopropyl group, a butyl group, an isobutyl group, a tert-butyl group, a pentyl group, a hexyl group, a cyclopropyl group, a cyclobutyl group, a cyclopentyl group, or a cyclohexyl group.

32. The method of claim 13, wherein a molar ratio among the compound of formula (II), total usage of the compounds of formulas (IV), (V) and (VII), and the deacid reagent is 1:(1.05-1.5):(1.05-1.5).

33. The method of claim 15, wherein the organic solvent is selected from toluene and chlorobenzene.

* * * * *